June 29, 1965

L. T. MORAWSKI 3,191,952

DIAPHRAGM CHUCK

Filed July 5, 1963

INVENTOR.
LONDON T. MORAWSKI

BY
Barney, Kiselle, Raisch & Choate

ATTORNEYS

United States Patent Office 3,191,952
Patented June 29, 1965

3,191,952
DIAPHRAGM CHUCK
London T. Morawski, Detroit, Mich., assignor of one-half to John J. Parker, Detroit, Mich.
Filed July 5, 1963, Ser. No. 293,060
2 Claims. (Cl. 279—1)

This invention relates to a chuck and more particularly to a type of chuck generally known as a diaphragm chuck.

Diaphragm chucks find particular usefulness for supporting workpieces, gears, for example, in an accurately located position for accurate machining operations. The conventional diaphragm chuck includes a backing plate which supports a centrally apertured diaphragm. The diaphragm, in turn, mounts a plurality of jaws with which workpieces to be machined are engaged. It is essential from the standpoint of accuracy that the jaws, in the work-engaging position, be accurately and immovably located on the diaphragm and, at the same time, it is important from the standpoint of economy that the jaws be adjustably mounted on the diaphragm so that they can be shifted and thus enable a single chuck to accommodate workpieces of different sizes.

It is an object of the invention to provide a diaphragm chuck which includes a jaw construction which enables the jaws to be shifted radially of the diaphragm to accommodate workpieces of different sizes and which, at the same time, is designed to maintain the jaws immovably fixed to the diaphragm when they are secured in their adjusted positions.

Figure 5:
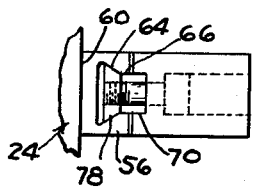
FIG. 5 is a fragmentary end view of a portion of the chuck as viewed from the radially outer end of one of the jaws.
Figure 4:
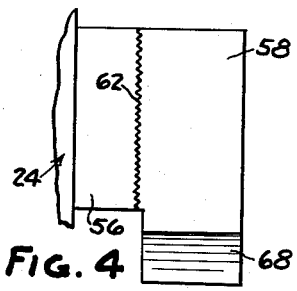
FIG. 4 is a fragmentary side elevational view showing the manner in which the jaws are mounted on the diaphragm.

The chuck of this invention includes a body member 10 to which is secured as by screws 12 a mounting plate 14. A backing plate 16 is fashioned with a peripheral flange 18 which seats in an accurately machined groove 20 formed around the periphery of mounting plate 14. The axially outer face of backing plate 16 is formed with an accurately machined peripheral groove 20a which forms a seat for the peripheral edge portion 22 of a diaphragm 24. The diaphragm 24 and backing plate 16 are solidly connected to the mounting plate 14 by a plurality of screws 26.

The front or axially outer face of mounting plate 14 and the rear or axially inner face of backing plate 16 are spaced apart to provide a cylindrical chamber 28. Within this chamber there is arranged a piston 30 provided with an annular seal 32 which engages the inner cylindrical wall 34 of flange 18. Backing plate 16 is fashioned with a central aperture 36 and diaphragm 24 is fashioned with a central aperture 38. A plug 40 fitted in apertures 36, 38 and provided with a seal 42 engaging the inner periphery of central aperture 38 in diaphragm 24 prevents the ingress of dirt and the like to chamber 28. A plurality of hardened pins 44 are slidably mounted for axial movement in backing plate 16 around the periphery of central aperture 36 therein. The heads 46 of pins 44 engage the inner face of diaphragm 24 around the central opening aperture 38 therein while the inner ends of pins 44 abut against a steel wear plate 48 at the center of piston 30. Thus, pins 44 form a rigid link extending between piston 30 and the portion of diaphragm 24 around the central opening aperture 38 therein.

Figure 2:
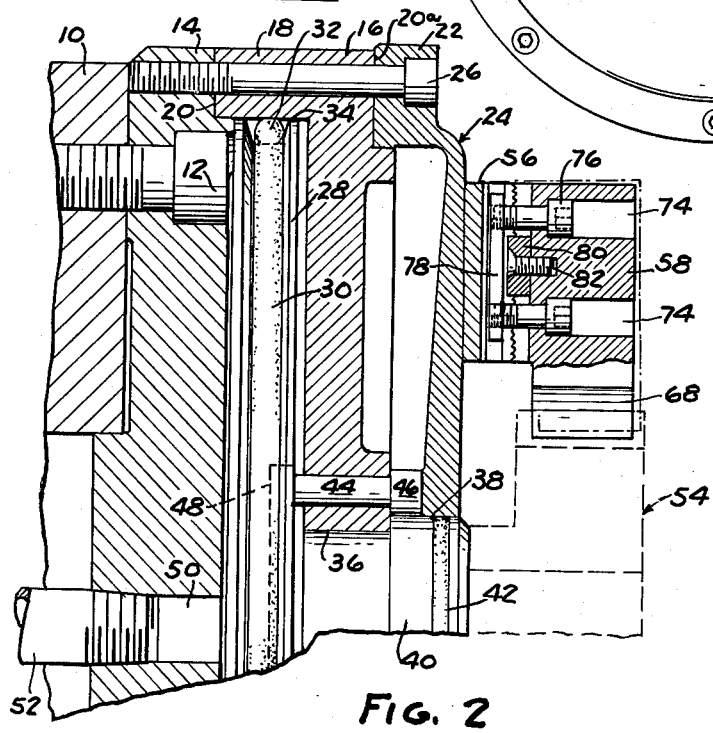
FIG. 2 is a fragmentary sectional view of the chuck taken along the line 2—2 in FIG. 1.
Figure 3:
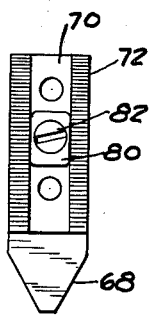
FIG. 3 is an end view of one of the jaws viewed from the inner side thereof.

Mounting plate 14 is formed with a central aperture 50 therein to which is connected a conduit 52 extending from a source of fluid pressure. In FIG. 2, the diaphragm 24 is illustrated in solid lines in its normal relaxed or closed position. When pressure from the conduit 52 is directed to the back side of piston 30, the piston is displaced axially in a direction toward the right as viewed in FIG. 2 and the interconnection with diaphragm 24 with piston 30 by way of pins 44 flexes the central portion of the diaphragm outwardly. The arrangement thus far described is more or less conventional and is disclosed as exemplary of one of many forms of diaphragm chucks to which the invention may be applied.

The invention is particularly directed to the jaw structure on the diaphragm for mounting workpieces, such as the gear generally indicated 54. This structure includes a plurality of jaw bases 56 on each of which are mounted a jaw 58. Referring to FIG. 5, each jaw base has a flat inner face brazed or otherwise fusion bonded to the axially outer face of diaphragm 24 as at 60. Each jaw base 56 is arranged on diaphragm 24 so that it extends in a generally radial direction. The axially outer faces of jaw bases 56 are fashioned with serrations 62 in the form of V-shaped grooves which extend in a direction normal to the radial extent of each jaw base. Each jaw base 56 is additionally formed with a dovetail slot 64 which extends lengthwise of the jaw base, that is, radially of the diaphragm. The dovetail slot 64 intersects the axially outer serrated face of the jaw base in a groove having opposed parallel straight sides 66.

Figure 1:
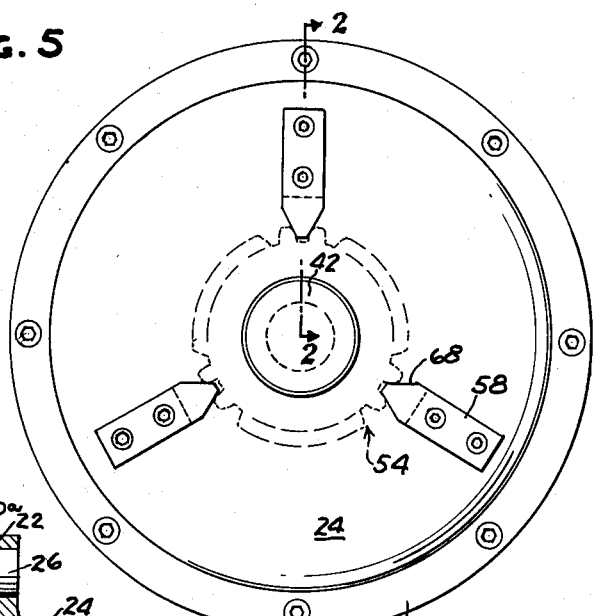
FIG. 1 is an end of a diaphragm chuck in accordance with the present invention.

Each jaw 58 is formed at its radially inner end with a configuration adapted for interengagement with the workpiece to be supported thereby. In the case of a gear, such as shown in FIG. 1, the radially inner end of each jaw may be desirably formed with a tapered nose 68 shaped to interengage between the successive teeth of the gear. The axially inner face of each jaw 58 is formed with a central straight sided groove 70 and at each side of groove 70 the axially inner flat face of each jaw 58 is formed with serrations 72 that are shaped and dimensioned to mate with the serrations 62 on the axially outer face of jaw bases 56. Each jaw base is fashioned with a pair of counterbored holes 74 to receive socket head screws 76. The threaded ends of screws 76 are arranged to engage in threaded openings formed in a bar 78 seated within the dovetail slot 64 in jaw bases 56. Referring to FIG. 5, it will be noted that bar 78 has its side faces inclined to correspond with the inclination of side faces of slot 64. Thus, when screws 76 are tightened, bar 78 is drawn up firmly against the inclined side faces of slot 64 and the serrations 62 on jaw base 56 and the serrations 72 on jaws 58 are brought into firm and tight interengagement so that the jaws 58 are rigidly and immovably mounted on the jaw bases 56. To assist in alignment of the jaws 58 on the jaw bases 56, a key 80 is secured to the axially inner face of each jaw base 58 by a screw 82. Key 80 is disposed in the slot 70 with a close fit between the serrated faces 72 and is adapted to project between and engage the straight side faces 66 of the groove of the jaw bases 56.

In assembling the jaws 58 on the jaw bases 56, screws 76 are initially threaded part way into bar 78. Then jaws 58 are manipulated to insert the bars 78 radially into the dovetail slots 64 on jaw bases 56 from either the radially inner or outer end thereof. When each jaw is located in the desired radial position on its respective jaw base, screws 76 are tightened to draw the bars 78 up tight against the inclined faces of the dovetail slots 64 and, at the same time, bring the serrations 72 on the jaws 58 into firm engagement with the serrations 62 on the jaw bases 56. The keys 80 assure proper radial alignment of the jaws on the jaw bases. Keys 80 have a close fit with the side faces 66 on the grooves in the jaw bases to prevent shifting of the jaws on the jaw bases in the direction of the serrations thereon. Thus, with this arrangement, since jaw bases 58 are immovably mounted on the diaphragm 24 by a solid fusion bond and since the mating engagement of serrations 62 and 72 together with the action of keys 80 immovably mount the jaws 58 on the jaw bases when the screws 76 are tightened, the jaws 58 are rigidly and immovably mounted on the diaphragm. Nevertheless, the jaw construction described enables the jaws 58 to be shifted radially inwardly and outwardly when desired so that a single chuck can accommodate workpieces of different sizes.

When fluid pressure is applied to piston 30, diaphragm 24 is flexed to open jaws 58 so as to receive the workpiece to be chucked. When the fluid pressure is relieved, the spring tension in the diaphragm causes the jaws to swing radially inwardly to firmly grip the workpiece. The manner in which each jaw 58 is mounted on diaphragm 24 renders the jaws immovable relative to the diaphragm regardless of the stress placed upon them when closing on the workpiece.

I claim:

1. In a diaphragm chuck of the type having a flexible diaphragm rigidly secured to a fixed backing member, that improvement which comprises a plurality of radially extending jaw assemblies mounted on the diaphragm in circumferentially spaced relation, each jaw assembly comprising a jaw base and a jaw on said base, each jaw base having the axially inner face thereof fusion-bonded to the axially outer face of the diaphragm so as to prevent even minute displacement of the jaw base relative to the diaphragm when the diaphragm flexes to close said jaw assemblies, the axially outer face of each jaw base having a dovetail slot therein extending lengthwise thereof and terminating at the said axially outer face of the jaw base in a radially extending groove, the side faces of said groove lying in planes parallel to an axial plane extending centrally through the dovetail slot, said axially outer face of the jaw base having a plurality of serrations thereon on opposite sides of said groove, said serration extending normal to the groove, each jaw having similar serrations on its axially inner face extending in a direction normal to its length and in mating engagement with the serrations on the jaw base to prevent relative movement of each jaw and its base in a radial direction, each jaw also having on the axially inner face thereof a generally rectangularly shaped key projecting into said groove, said key having straight sides which have a close fit with the side faces of said groove to prevent relative movement of the jaw base and jaw in a direction normal to the groove, an anchor member in said dovetail slot, said anchor member having converging side faces in coplanar engagement with the inclined side faces of the dovetail slot and threaded members extending through each jaw and into threaded engagement with the anchor member in its respective jaw base for tightly clamping the anchor member against the inclined faces of the dovetail slot and the serrated faces of the jaw against the serrated faces of the jaw base.

2. The combination called for in claim 1 wherein the serrated face of the jaw has a straight groove therein extending lengthwise of the jaw, said last-mentioned groove being of rectangular shape in cross-section, said key having a close fit in both said grooves and threaded means retaining the key in said last-mentioned groove.

References Cited by the Examiner

UNITED STATES PATENTS

| | | | |
|---|---|---|---|
| 2,777,704 | 1/57 | Sloan | 279—123 |
| 2,869,884 | 1/59 | Etchell | 279—123 |
| 2,958,532 | 11/60 | Benjamin | 279—4 |

ROBERT C. RIORDON, *Primary Examiner*.